July 31, 1928.  
C. M. MANLY  
PROCESS FOR MAKING VEHICLE TIRES  
Original Filed Feb. 28, 1923   4 Sheets-Sheet 1

Inventor  
Charles M. Manly  
By his Attorney

July 31, 1928.
C. M. MANLY
1,678,866
PROCESS FOR MAKING VEHICLE TIRES
Original Filed Feb. 28, 1923   4 Sheets-Sheet 3
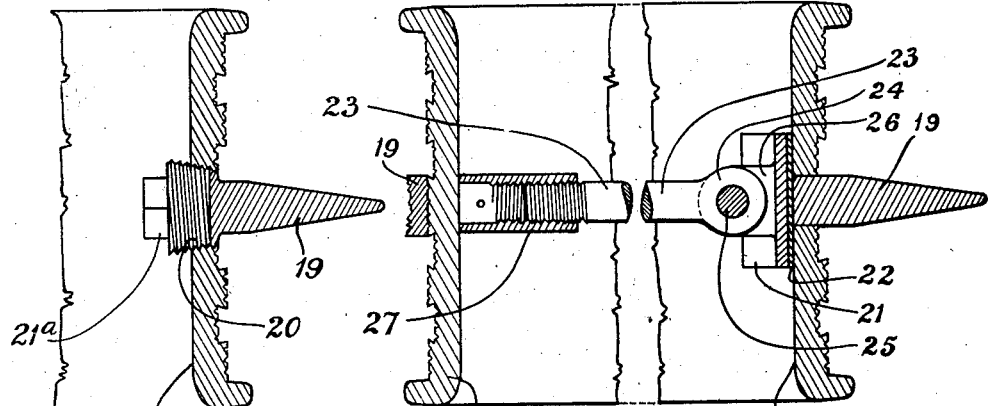
Fig. 5ª.   Fig. 5.
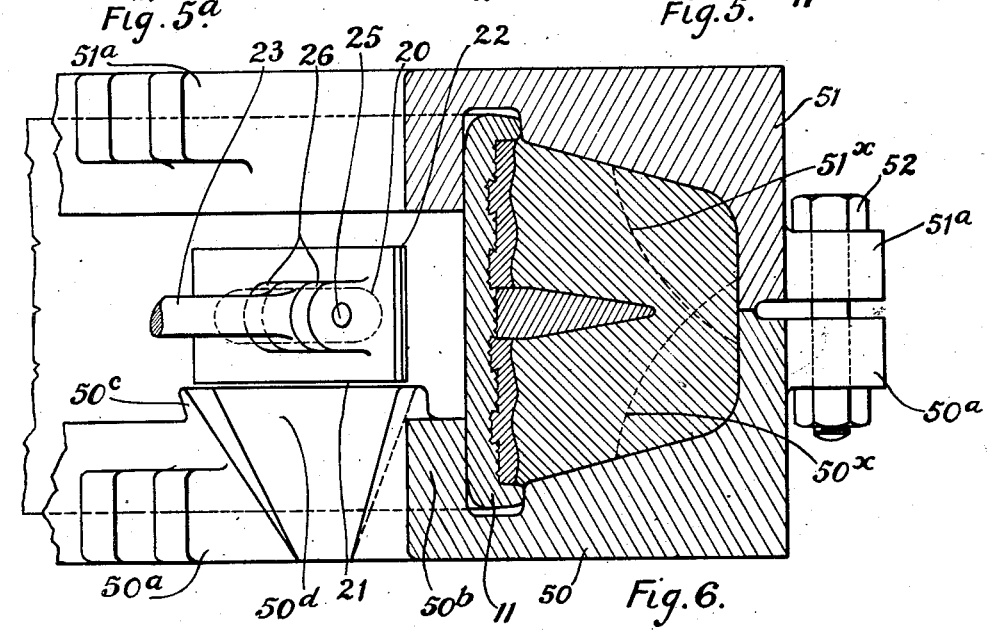
Fig. 6.
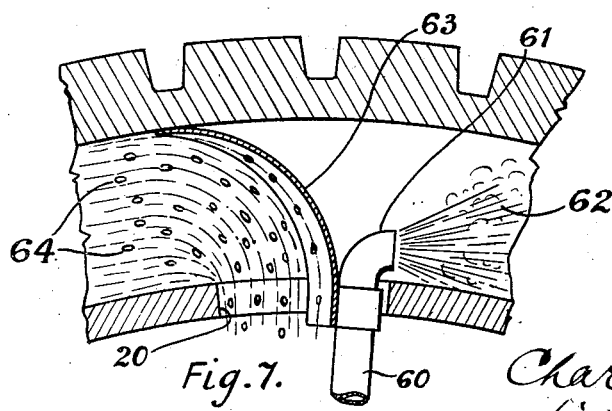
Fig. 7.
Inventor
Charles M. Manly
By his Attorney July 31, 1928.                    1,678,866
C. M. MANLY
PROCESS FOR MAKING VEHICLE TIRES
Original Filed Feb. 28, 1923    4 Sheets-Sheet 4

Inventor
Charles M. Manly
By his Attorney

Patented July 31, 1928.

1,678,866

UNITED STATES PATENT OFFICE.

CHARLES M. MANLY, OF RICHMOND HILL, NEW YORK, ASSIGNOR TO OVERMAN CUSHION TIRE COMPANY, INC., A CORPORATION OF NEW YORK.

PROCESS FOR MAKING VEHICLE TIRES.

Application filed February 28, 1923, Serial No. 621,784. Renewed July 23, 1925.

Figure 1:
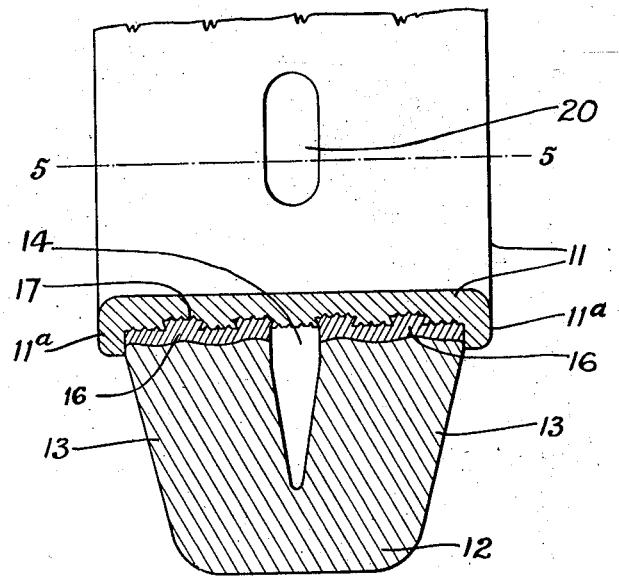
Figure 8:
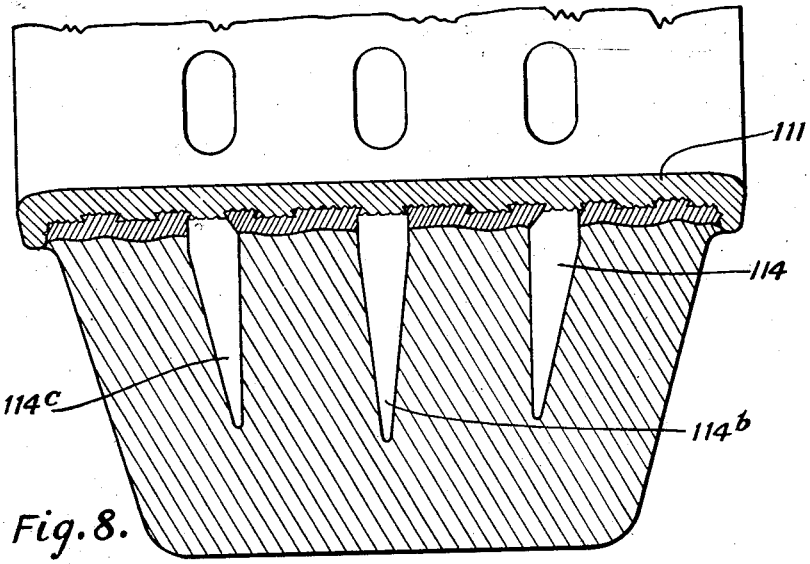

My present invention relates to an improved process and improved means for making vehicle tires and improvements in tires containing closed or substantially closed cavities such, for instance, as the tire illustrated in Figures 1 and 8 in the annexed drawings.

The tire of Fig. 1 differs from tires of somewhat similar construction in the prior art in that the metal base band or flanged tire rim to which the tire is joined by vulcanization is used in substantially the same form as it is used for the standard solid or uncored tire, and at the same time the body of the rubber compound is provided with one or more circumferentially extended or continuous interior cavities into which the body of the rubber may expand when its form is compressed by the loads which it carries or the road shocks it absorbs when in operation on a vehicle wheel. It has heretofore been found necessary in providing interior cavities which were circumferentially continuous, or substantially so, in tires that are vulcanized to metal bases, to either circumferentially split the base in line with the cavities or to provide a series of longitudinally extended slots in the said base in line with the said cavities to permit of the removal through said base of the core used in forming the cavity in the process of molding and vulcanizing it. This splitting or slotting of the base has been necessary on account of the fact that the cores heretofore generally used have had to be removed while the material of the core was in a solid condition, and the splitting or slotting of the steel base bands to enable such removal of the solid cores, even when they were divided up into short lengths to enable them to be removed in sections, has not only weakened the said base bands, especially as regards their being secured to a narrower felloe of the vehicle wheel by being forcibly pressed thereon, but the expense incident to such splitting or slotting has been a considerable item in the cost of manufacturing the tire. My present process and means enables me to make this tire with said metal base band practically unaffected as regards its strength and adhering qualities when pressed on to the felloe of a wheel and with a minimum expense over and above that involved in preparing it for use with a solid or uncored tire.

Figure 2:
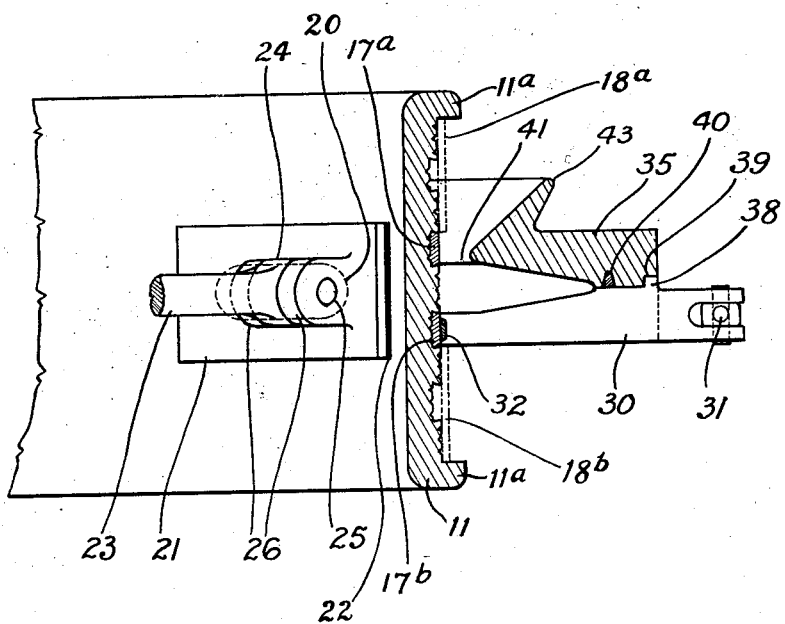
Figure 3:
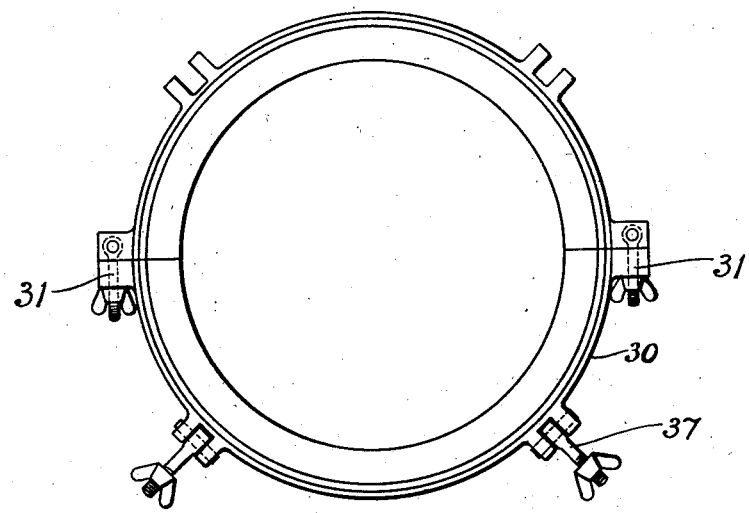
Figure 4:
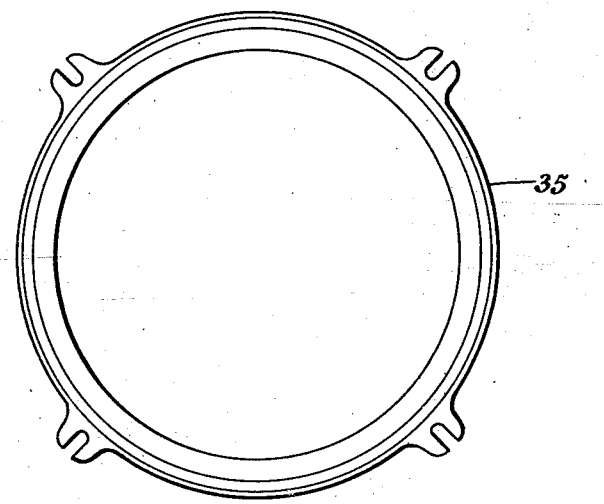
Figure 9:
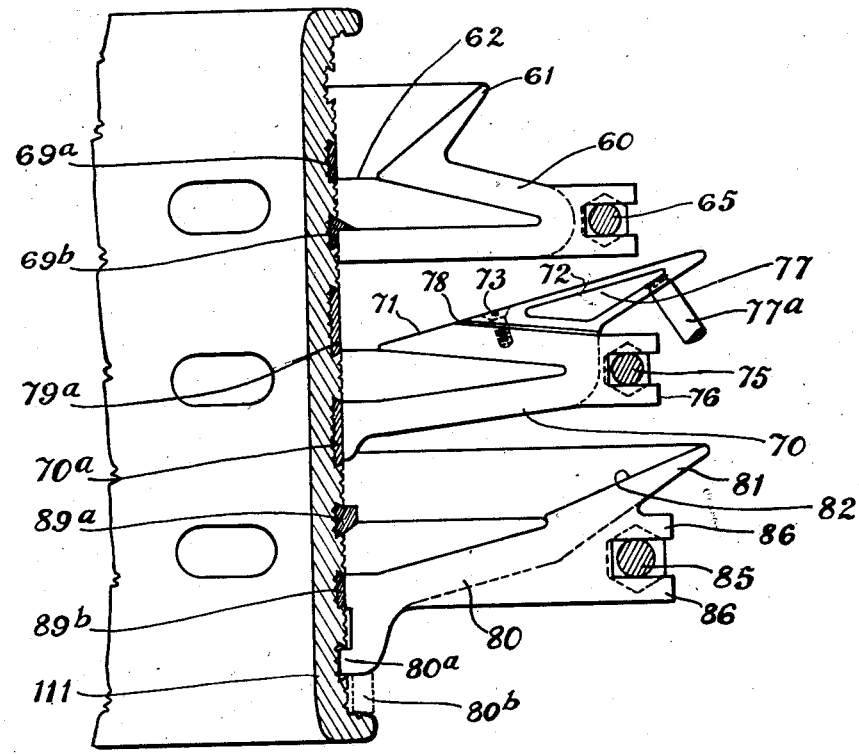

In the drawings which illustrate preferred embodiments of my invention, Fig. 1 is a cross section and partial elevation of a finished tire vulcanized to a metal base band and provided with an interior circumferentially continuous cavity, the tread being shown downward, as in ground contact; Fig. 2 is a similar section and partial elevation of the metal base band of Fig. 1 with the mold for forming a core mounted on the base band which is shown in the horizontal position; Fig. 3 is a top plan view of the lower half of the core mold of Fig. 2; Fig. 4 is a bottom plan view of the upper half of the core mold of Fig. 2; Fig. 5 is a cross section and partial elevation of the base band after the core is molded on it; Fig. 5$^a$ is similar to Fig. 5 except as hereinafter pointed out; Fig. 6 is a cross section and partial elevation similar to Fig. 2 except that the core mold has been removed after molding the core and the tire body and mold therefor have been added; Fig. 7 is a longitudinal section through a fragment of the tire on the median radial line through the cavity, with other details later explained; Fig. 8 is a cross section and partial elevation of a triple cored tire with its tread downward as in ground contact; and Fig. 9 is a similar section and partial elevation of the metallic base band of Fig. 8 with a set of these molds for forming the three cores mounted on the base band, which is shown in the horizontal position.

It will be understood that my improved process and means are adapted to make tires of other forms than those illustrated, but nevertheless the forms shown will serve very well to illustrate the nature and operation of my improvements.

The tire shown in Fig. 1 is a cushion tire made of rubber or rubber compound and comprises a metal base band 11, of the well known standard S. A. E. type such as is at present used almost universally for solid tires of the pressed-on type, on the outer circumference of which is mounted the rubber body of the tire comprising a tread portion 12, integrally uniting the two circumferentially continuous side members 13, separated by the cavity 14, and united to the harder base portion 16, which is vulcanized and mechanically joined to the outer circumference of the metal base band 11, by the usual dove tail corrugations 17 and flanges 11ª thereof.

In order to obviate the necessity of splitting or slotting the metal base band 11, of the tire shown in Fig. 1, to permit the removal of the solid core after the tire has been vulcanized, I make the said core 19, of Fig. 5, of any suitable material which is sufficiently hard and strong to resist deformation while the rubber body of the tire is being formed and compressed in the mold, and at the same time having a melting temperature or fusion point such as to enable the said core 19 to be melted into a fluid condition at a temperature that will not injure the rubber compound of which the tire is formed. In fact I at present prefer in using my improved process and improved means for making such tires, to use sulfur, or an alloy of metals, for the core, that becomes fluid at the temperature at or just below which the last portion of the curing process of the rubber compound is effected, so that upon the tire in its mold being removed from the vulcanizing furnace the said core is in a molten condition ready to flow out through one or more small apertures provided therefor, without delay or the application of a higher degree of heat thereto. To enable said core to be thus removed I provide the metal base band 11 with one or more radially formed holes 20 through which the molten core may run out, the said radial holes 20 being circular and threaded if desired to receive stopping plugs 21ª, Fig. 5ª, or elongated with suitable hole covers therefor which prevent the said core from passing through the holes until these plugs or covers are removed.

I am aware that it is old in the art of making pneumatic tires and casings therefor to use a core formed of various metal alloys which melt at temperatures such that the said cores become fluid during the vulcanization of the tires, and that these cores are removed by being drained, while in such molten condition, from the said tires. I am also aware that it has been stated by one or more prior inventors that similar cores of readily fusible alloys might be used in the molding of cavities in cushion tires of the type in which a body of rubber vulcanized to a metal base is provided with an enclosed circumferential cavity in the body of the rubber. However, in all of the above mentioned proposals and prior art, the cavity to be formed by the said fusible core has been entirely surrounded or enclosed by the body of rubber or the base has been open with the core projecting through the circumferential slit therein, and in such instances where it has been proposed to use a core in connection with a rubber tire body vulcanized to a unitary steel base band provided with outwardly projecting flanges, the core has either been articulated or non-rigid and discontinuous annularly and unanchored laterally, or the interior diameter of the said core has been large enough to permit it to be passed over the exterior circumference of the said flanges, and the core if made in this latter way, would therefore be separated from the metallic base band by a considerable thickness of rubber. This results in the core being indefinitely located or anchored, both laterally and radially with reference to the metallic base band, and consequently results in the cavity formed in the tire by said core being indefinitely located in the finished tire. Furthermore, such a core having no direct connection with the metallic base band, would be less effective in conducting heat to the interior of the body of the rubber during the vulcanization process, than it would were the core either connected to the base band or otherwise provided with means for enabling it to conduct heat from the outside of the tire to the interior of the cavity being formed by it.

Among the more important features therefore, of my present invention in its preferred form are the provision in the finished tire of the type having a rubber body vulcanized to a unitary flanged metallic base band; of a cored annular cavity, the inner circumference of which is formed by the exterior circumference of the metallic base band to which the body of the tire is vulcanized, the firm securing or anchoring of the fusible core forming this cavity in a definitely predetermined position on the exterior circumference of the metallic base band, the securing of a highly effective heat conducting joint between the said fusible core and the metallic base band, the method and means for carrying out these features and properly utilizing them in the molding of the tire, and the removal of the molten core after the tire has been molded and vulcanized.

While the fusible core shown in Fig. 5 may be made of a fusible metal alloy, and with a transverse split in it to enable it to be sprung open to a larger internal diameter so that it can be slipped over the larger diameter of the flanges of the base band, or may be made in two or more circumferential portions for this purpose, and the core afterward joined together and also joined to the metallic base band itself by soldering or other suitable means, still I prefer for reasons of strength and cost, regardless of the material of which it is made, to make the said core as a solid undivided ring, and in order to do so I have devised means for molding the said core in place on the base band. This means of molding the core in place on the base band is of particular importance where the material of the core is non-metallic, as sulfur, since with such material it would be difficult and tedious if not impossible, to make the core both strong and in intimate contact with the base band if it were premolded in sections and joined together after being applied to the base band, though when the core is not subjected to high local stresses in the molding of the rubber body and especially in the molding of tread recesses, a non-metallic core that is premolded in sections and joined together on the base-band, and is thereby reinforced by the said base-band against the molding stresses coming on it, may be used even though it is likely to have less effective heat conducting contact with the base-band.

To make the tire shown in Fig. 1 I preferably proceed as follows;—the metal base band 11 of the standard unitary type, is preferably first provided with the special hole such as 20 of Fig. 1 here shown as rectangular with rounded ends and of a width the same as that of the tire cavity to be formed, but it may be circular and of diameter greater than the width of the cavity and closed by a pipe plug $21^a$ or other threaded member, as indicated in Fig. $5^a$. The base band is then layed in a horizontal position as in Fig. 2, on a table or bench (not shown), and the said hole 20 is closed in any suitable manner, but here shown as by a plate 21 having substantially the same curvature as the interior circumference of the band 11, with a layer or gasket of a suitable soft material 22, such as asbestos, to ensure a fluid tight joint between the said plate 21 and the said band 11. The plate 21 is held in place, tightly pressed against the interior of the band 11, by suitable means, such as the rod 23 provided with a pierced end 24 which, by means of a pin 25, is pivotally connected to the protruding yoke members 26. The other end of the rod is provided, as shown in Fig. 5, with an adjustable extension thimble 27 having threaded connection with the end of the rod. By turning the said thimble 27, the rod 23 may be readily caused to either react against the opposite diametral point of the band and press the cover plate 21 tightly over the hole 20, or if the thimble is turned in the opposite direction the said cover plate may be readily loosened up and removed. The said hole 20 being thus closed, asbestos wicking, or other suitable material, is now, or at any previous time, wound into the two grooves $17^a$ and $17^b$ to fill the same flush with the top of the adjoining tongues, assuming, of course, that the size and location of the tongues and grooves is as shown in Fig. 2. A lower core molding member 30, made in two similar halves and provided with clamping bolts 31 for clamping it together as shown in Fig. 3, is then placed around the band 11 and clamped into the position shown in Fig. 2, with its interior circumference fitting tightly against the packing in the groove $17^a$. This lower mold member may be supported in the position shown in Fig. 2 either by the tightness with which it is clamped around the band 11, or by suitable blocks or legs extending between it and the flange $11^a$, or between it and the table or bench on which the band 11 rests. The upper half 35 of the core mold shown in Fig. 4 as made in the form of a solid ring with its interior circumference sufficiently large to freely pass over the outer diameter of the flange $11^a$ of the band 11, is then lowered into the position shown in Fig. 2 and tightly clamped against the lower half 30, by means of the clamping bolts 37, shown in Fig. 3. A suitable annular tongue 38 and groove 39 properly locate the upper half 35 with respect to the lower half 30 of the core mold. Also a suitable packing such as 40 may be provided for ensuring a fluid tight joint between the upper and lower halves of the core mold. It will be readily understood that the above described core mold may, if desired, have the upper and lower halves formed integral and be divided into circumferential halves, clamped together by the bolts 31, as shown in Fig. 3 for the lower half, thus obviating the joints between the upper and lower halves and the clamping bolts 37. I prefer however, in using it to also split it into upper and lower halves as above described. Also the inner circumference of the mold where it clamps around the band 11 may be provided with a groove containing packing, as 32 of Fig. 2, to ensure a fluid tight joint where the tongues are so positioned that the mold when clamped on the base band contacts with one of these tongues.

With the core mold secured to the base band 11, as shown in Fig. 2, and as above described, it will be noted that the entire contour of the core is formed by the mold, except for the short horizontal part 41 between the inner perimeter of the upper half of the mold 35 and the base band 11. It will also be noted that the upper half 35 of the mold is provided with an annular flaring lip 43, giving a belled mouth to that portion of the mold which surrounds the space 41. This belled mouth is provided as a ready means of guiding the melted core material in pouring it into the said core mold. It will be noted that this mouth of the mold is thus left open around the entire inner circumference of the core to be formed, and that this opening occurs at the uppermost point of the said core. This is for the purpose of not only ensuring that all air in the core mold may readily pass out, but that when the melted core material is poured in, in a definite quantity to cause the mold to be exactly filled, it can be effected without the necessity for sprues, gates, risers, or other protruding excrescences, which would afterwards have to be cut off to leave the core in the condition desired. It will also be noticed that the filling point of the mold occurs at the thickest point of the core, thereby ensuring that, as the material chills, expansion or contraction of the core can readily occur without deforming it at any point except the point of filling, and since this is a horizontal surface it requires a minimum amount of experience with the mold to determine exactly how much material to pour into it to ensure that, when the core does harden, the surface 14 will be in exactly the position, and give the core the dimensions, desired at this point. As soon as this core has become sufficiently hardened the core mold may be readily removed, by unclamping the previously described clamping bolts 31 and 37, leaving the core snugly mounted on and secured by fusion to the base band 11 as shown in Fig. 5 in which the cross section has been made directly through the hole 20 in the base band 11. The asbestos wicking or other material which has been wound into the grooves 17ª and 17ᵇ may then be removed, that in 17ª having served its purpose of preventing the metaled core material from getting into the said groove, and that in 17ᵇ having not only served a similar purpose but also that of ensuring a tight joint between the base band 11 and the lower half of the core mold 30, to prevent any of the material of the core while in a fluid condition from passing between them. The cover plate 21 and securing rod 23 may now be removed from the base band 11, if desired, to be later replaced, or they may be left in the position shown in Fig. 5 until after the vulcanizing of the rubber tire body, now to be formed on the base, has been effected. In preparing the base band 11 for molding the core onto it as above described, it may, or may not be desirable or necessary to coat that portion of the band against which the core is to be secured, with a suitable fluxing compound, the desirability of using a flux depending upon the composition of the core. It is to be understood, however, that where desired my process includes the use of such a flux, it being highly desirable that the joint between the core and the metallic band 11 be such as to not only give a high degree of mechanical firmness to the location of the core, but also a highly effective heat conductivity in said joint.

With the core mounted on the base band 11, as above described, the band is now ready to be subjected to the usual process of building and vulcanizing the tire body thereon, the compound for forming the harder vulcanized portion 16 of the base being first applied, as well known in the art, followed by the building up, or extruding and applying, of the members 13 and tread 12, and the placing of the raw tire thus formed in a suitable mold and compressing the same therein preparatory to vulcanizing the same under the combined influences of heat and pressure. I have indicated in Fig. 6, a conventional form of mold to bring out clearly the fact that my present process and apparatus may be readily used in combination with such a mold. In Fig. 6, 50 represents the lower half of the said tire mold, and 51 the upper half thereof, with suitable clamping lugs 50ª and 51ª and co-acting bolt 52 for holding same together. It will also be noted that the cover plate 21 and securing rod 23 are shown as having been replaced or left in the base band 11 to tightly close the hole 20. With this hole 20 thus closed, the mold with the tire, core and base band in it, may now be subjected to the vulcanizing process. It will be noted that not only is the mold directly in contact with the base band 11, but that a large portion of the interior surface of the said band is uncovered, thereby ensuring that the heat of the vulcanizing oven will readily reach the base band 11, and since the core as above described is suitably mechanically and thermally joined to the said band 11, heat will readily pass into the said core and thus enable it to properly perform its function in assisting in the vulcanizing of the tire body in an expeditious and uniform manner, whereas with the core not thus joined to the band by highly efficient thermal connection therewith, not only would all or most of the heat for the vulcanizing of the innermost parts of the tire body have to pass from the outside through material having a low thermal conductivity but the heat necessary for raising the temperature of the core itself would also have to pass from the outside through inefficient heat conducting media.

Since the core preferably melts at a somewhat lesser temperature than the highest temperature to which the tire is subjected in vulcanization, the core is in a fluid condition when the vulcanization is completed and the mold and tire are removed from the vulcanizing oven. Immediately upon removing them from the oven the cover plate 21 is released and, with the tire and mold in the horizontal position, all or practically all of the core material immediately runs out through the hole 20, this being assisted by slightly elevating one edge of the tire and mold to bring the hole 20 to the proper location to effect such results, as will be readily understood. Such material of the core as does not readily pass out of the cavity in the tire, may be readily removed while in a still molten condition, or be remelted without subjecting the tire to a deleterious temperature, by suitable means, such as that shown in Fig. 7, in which a fragment of the tire is shown in horizontal cross-section, taken on the median radial line through the cavity. I there show a pipe 60, provided with a curved head or elbow 61, with a stream of steam 62 illustrated as issuing therefrom. Mounted on the side of the pipe 60, opposite the elbow orifice, is a curved guard 63, made in the form of a trough having a tapered profile closely corresponding with that of the cavity. With this guard 63, mounted on the pipe 60, in position in the tire as shown and with a source of steam or hot gas connected thereto to supply such a stream as illustrated by numeral 62, the said stream of steam or hot gas will be caused to shoot around through the tire cavity and out through the opening 20, being guided thereto by the guard 63, such stream melting and carrying with it loose particles of core material such as illustrated by numeral 64. By reversing the position of the pipe 60 and the guard 63, one or more times, and thus shooting the steam around first in one direction and then in the other, with the tire held in various positions, the tire cavity may be completely freed of all core material. The mold may be removed from the tire either before the core is removed or afterwards, as desired, it being preferable to leave it in place until the larger portion of the core material has been removed to ensure keeping the core in the greatest degree of fluidity until the operation is completed.

Formed on the annular flange $50^b$ of the lower half of the tire mold is a lip $50^c$ which extends against the base 11 in line with and practically up to the edge of the cover plate 21, and formed in this lip and extending slopingly downward across the face of the flange $50^b$ is a chute or guide $50^d$ for guiding the melted core material, issuing from the hole 20 when the cover 21 is removed, across the face of the said flange $50^b$, thereby enabling the complete salvaging of the said core material for reuse to be effected by catching it in a proper receptacle regardless of whether the core is withdrawn before or after the tire mold is removed.

In order to prevent the surfaces of the otherwise unprotected tongues and grooves of the base band from being contaminated either by vapours settling on them or otherwise during the casting of the core I prefer to either coat the said surfaces with a suitable coating depending on the material used for the core, or to put protective bands of rubber or rubberized material such as are illustrated in dotted lines and designated by $18^a$ and $18^b$ in Fig. 2.

The securing of the core firmly to the base band by fusing it directly thereon or otherwise is especially important where the tire is of the type having tread recesses or cavities molded therein as indicated by the dotted lines in Fig. 6, these cavities being formed by the tread cores $50^x$ and $51^x$ carried by the lower and upper halves of the mold 50 and 51 respectively of Fig. 6 and being alternately spaced around the circumferences of the two halves of the tire mold. As the tire mold is closed over the body of rubber compound in molding the tire, these tread cores are squeezed into the said compound, and unless the core is quite firmly attached to the base it is likely to be displaced by the movement of the compound during this molding operation.

Where desired, other means may be employed for removing the remnants of core material from the cavity of the tire, one or more round holes therefor being provided, and these may be conveniently closed and opened at the proper times by screw threaded plugs as $21^a$ of Fig. $5^a$. These may, especially if two or more are used, be of a diameter no greater than the thickness of the core, or may be larger as shown, it being preferable however to make them no wider than the core so as to disturb to the least extent the continuity of the fastening of the harder base material to the metallic rim or base band.

By referring to Fig. 9 it will be readily understood how my present process and apparatus may be applied in the making of multiple cavity tires; such as that shown in Fig. 8. A separate mold for the core for each of the tire cavities, each having a suitable interior form to produce the particular cavity desired, may be made like the core mold already described, and each applied in succession to the base band 11. However, for economy in manufacturing such tires, I prefer to employ a set of molds as shown in Fig. 9, whereby the molding of all the cores may be effected simultaneously. It will there be noted that with the band 111 in the horizontal position, the mold 60 is in the proper position to mold the core to form the cavity 114 that comes at this point of the tire. Since it is the uppermost mold, it may be provided with a fairly narrow bell mouth 61 for guiding the core material into the mold to fill the same to the horizontal line 62 which marks the upper limit of the core. However, the mold 70 for the middle core $114^b$ lies under the upper mold 60 and is so completely covered by it that I have provided a wide lip for extending the bell mouthing out beyond the outer perimeter of the mold 60. This extending of the lip is preferably effected by the means shown, comprising an annular member 72 resting on and secured to the upper side of the mold 70 by a series of screws 73, with the upper flaring face of the member 72 in alignment with the sloping face 71 of the mold 70. The mold 70 is split into two circumferential halves and bolted together, in place on and tightly clamping the base band, by the bolt 75 coacting with suitable lugs 76 on the two halves of the mold. The annular member 72 is also divided into two circumferential halves demountably clamped together and provided with a cored interior 77 whereby steam or other heated fluid introduced through the pipe 77ª may be circulated in it to ensure that the core material in passing over the surface of this lip 72 will not be chilled. A heat insulating gasket 78, of asbestos or other suitable material, may be used between the lip 72 and the mold 70 to prevent the mold from being heated, as it is desired for expedition in manufacture that the cores become set quickly once they fill the mold.

It will be noted that the lower core for the cavity 114ᶜ to be formed on the base band 111 is so shaped that the entire upper side of it is horizontal. In this core therefore it is not necessary to provide the mold 80 for it with a wall to enclose any portion of this face, and the mold 80 is therefore shown as comprising only a lower wall extended into a lip 81, with the upper face 82 of the lip stepped up a sufficient amount, where it joins the inner surface of the lower wall, to give a rounded nose to the apex of the core. The lip 81 may be provided with a cored interior if desired and made as a divided separate member thermally insulated from the mold 80, to enable a heating fluid to be circulated in it as above described for the lip or annular member 72. Bolts 85 coacting with lugs 86 serve to clamp the two circumferential halves of the mold 80 together tightly around and against the base band 111.

Before clamping the several molds 60, 70 and 80 into the positions shown in Fig. 9 the several grooves in the base band 111 are filled as shown with asbestos wicking or similar packing, the packings 69ª and 79ª merely filling their grooves to prevent the entrance of core material therein. The packing 69ᵇ may just fill its groove to make a tight joint with the mold 60, but preferably it has an extended ridge lying against the upper face of the mold so that the corner of the core will be beveled off as shown to ensure a stronger corner on the hard rubber of the base of the tire at this point, as it is important that the joint between the hard rubber of the base and the metal rim be weakened the least amount possible in providing the cavities in the tire. Similarly the packing 89ª protrudes beyond its groove and has a beveled corner to strengthen the hard rubber which will later fill this groove, and the packings 70ª and 89ᵇ fill their respective grooves to make fluid tight joints with the molds 70 and 80. Each of these molds may have a projecting tongue, such as 80ª on the mold 80, for resting in the adjoining groove and against a tongue for giving the core mold a firm support on the base band, or the circumferential clamping may be relied on for supporting the molds, or supporting lugs may extend from the lower mold 80 to the assembling table or to the lower flange of the base band as shown dotted by 80ᵇ and from this lower mold supporting lugs may extend up to the middle one and from this to the upper one, as desired.

The three molds being in place and the proper grooves suitably packed as described and each of the holes 20ª, provided in the rim in line with the cavity to be formed over it, being closed by a suitable cover plate similar to that described as 21 for the base band 11, the measured quantity of melted core material necessary to properly fill each mold is poured into its respective mold. Immediately that the cores are hard, the core molds and groove packings are removed and the base band with the cores mounted on it is ready for the further operations of applying the material for forming the hard rubber base, the body of softer rubber and the process of molding and vulcanizing, followed by the removal of the melted cores and the cleaning of the cavities, all as above described for the tire with the single cavity.

As previously stated herein the cores for the cavity or cavities of the tires may be molded of an alloy of metals having a melting point below the maximum temperature used in the vulcanization process. Such alloys may be composed of bismuth and tin or bismuth, tin and cadmium in such well known proportions as have correspondingly varying but definitely known melting points ranging from far below 239° F., the lowest temperature at which vulcanization occurs, up to temperatures above 300° F., which is as high as I consider it best to use. However, owing to the loss of material by the formation of dross on such alloys when melted, and otherwise, I find it much more economical to use sulfur than the more expensive metal alloys. While the temperature of 239° F. at which sulfur melts is the same as that which vulcanization of the rubber compound begins, yet owing to the fact that the outside of the tire mold gets heated in the vulcanizing oven more rapidly than the base band, the heat from the mold penetrates into the body of the tire and causes sufficient setting of the compound by the time the core of sulfur has had sufficient heat transmitted to it to meet the requirements of its latent heat of fusion and melt it, that the early melting of the sulfur core does not inhibit its use for the purpose. To prevent over vulcanization in the rubber compound immediately adjoining the core, due to the use of such a vulcanizing agent as sulfur for the core, the core may be given a coating of plumbago or a salt or any other material that is inert to both rubber and sulfur. Such a coating for the core should preferably have a thermal conductivity not less than that of the core to avoid increasing the resistance to heat flow from the core into the body of rubber compound.

It is to be particularly noted that by having a complete circumferantial strip of the metal base band exposed to the cavity in the tire, the air which is in the said cavity when the tire is in use is better able to conduct the heat from the walls of rubber compound and deliver it to the base for ready dissipation than if the metal base band were not exposed for this purpose. Furthermore, by making the hole or holes in the base band round and threaded as in Fig. 5ª, the said holes may be hermetically sealed with threaded plugs which do not protrude into the interior of the base band after the tire is completed, and a small quantity of water or other liquid may be thus introduced sealed up in the said cavity, thereby ensuring a much more efficient conduction of the heat to the base band from the inner faces of the walls of the tire when the said tire is in service. Such increased removal of the heat from the inner faces of the walls of the tire correspondingly reduces the deterioration of the tire from excessive heating arising from excessive loading or speeding of them. The foregoing is the subject of patent application improvements in vehicle tires, Serial No. 279,580, filed May 21, 1928, by the executors of the estate of Charles M. Manly, deceased, being a continuation in part of the present main application.

It will be understood that this invention is not limited to the preferential embodiments herein illustrated but that it may be practiced through a wide range without departing from the scope and spirit of the appended claims.

What I claim is:

1. The process of making cushion tires which comprises molding a hard and strong, fusible core member into fused contact with the outer peripheral surface of an endless metallic tire base band, building a tire body of uncured rubber compound on the base band and around the exposed surface of said core member, compressing the uncured tire body to a definite form between rigid mold members and the exposed surface of the core and the outer periphery of the tire base band, applying heat externally to the mold members and the base band and through them to the said core member and to the tire body, while the latter is thus compressed, to vulcanize and permanently unite it to the base band and to melt the said core during the vulcanization of the tire body.

2. The process of making cushion tires which comprises molding a hard and strong, fusible core member into fused contact with the outer peripheral surface of an endless perforated metallic tire base band, building a tire body of uncured rubber compound on the base band and around the exposed surface of said core member, compressing the uncured tire body to a definite form between rigid mold members and the exposed surface of the core and the outer periphery of the tire base band, applying heat externally to the mold members and the base band and through them to the said core member and to the tire body, while the latter is thus compressed, to vulcanize and permanently unite it to the base band and to melt the said core during the latter part of the vulcanization of the tire body, and removing the molten core through the perforated tire base band.

3. The process of making cushion tires which comprises molding a substantially undeformable, fusible core member into thermal conducting contact with the outer peripheral surface of an endless metallic tire base band, building a tire body of uncured rubber compound on the base band and around the exposed surface of said core member, compressing the uncured tire body to a definite form between rigid mold members and the exposed surface of the core and the outer periphery of the tire base band, applying heat externally to the mold members and the base band and through them to the said core member and to the tire body, while the latter is thus compressed, to vulcanize and permanently unite it to the base band, melting the said core and removing it from the tire.

4. The process of making cushion tires which comprises securing a substantially undeformable fusible core member in laterally anchored thermal conducting contact with the outer periphery of a perforated metallic tire base band in radial alignment with a perforation therein, of which there need be only one, building a tire body of uncured rubber compound on the exposed outer peripheral surface of the base band, compressing the uncured tire body to a definite form between rigid mold members and the exposed surfaces of the core member and the base band, applying heat through the mold members, base band and core member to the tire body while thus compressed to vulcanize and permanently unite it to the base band and to melt the said core member during the vulcanization of the tire body, and removing the molten core member through a perforation in the tire base band.

5. In a process for making cored tires of rubber compound vulcanized to the outer peripheral surface of metal bases, the molding directly on to a portion of the said surface of the metal base of a core of fusible material while protecting against contamination another portion of said surface of the base to which rubber compound is to be later secured.

6. In a process for making hollow cored tires of rubber compound permanently vulcanized to a unitary metal base band, the use of a material for the core fusible below a temperature injurious to the rubber compound, the removal of the larger part of the core material in a fused condition through an aperture in the base after the tire is vulcanized, and the removal of the remaining portion of the core material through the said aperture by a hot fluid stream introduced through the said aperture and directed circumferentially through the hollow.

7. The method of making vehicle tires which comprises forming about a metal base-band a core of material fusible at a temperature above that at which rubber compound becomes plastic and below that which injures said compound, applying said rubber compound about the base-band and core, heating the rubber compound to a temperature below the fusion point of the core and applying external pressure thereto to mold it against the core; thereafter raising the temperature of the assemblage above the fusion point of the core, and removing the fused material which composed the core through an opening in the vulcanized assemblage.

8. The method of making vehicle tires which comprises forming on the outer peripheral surface of a metal base-band a fusible tapering annular core having substantially its widest portion in direct and extensive contact with said outer surface of the base-band, applying rubber compound to the base-band and the core, enclosing the rubber compound in a mold, and applying heat to the rubber compound through the mold and through the base-band and core to vulcanize said rubber compound and fuse the core, and removing the material which composed the core.

9. The method of making vehicle tires which comprises forming an annular fusible core on the middle portion of the outer peripheral surface of a metal base-band with its inner surface in direct and extensive contact with the base-band, applying rubber compound about the base-band and core, enclosing said rubber compound and the edge portions of the base-band while leaving the middle portion of the inner surface of the base-band exposed, and applying heat directly to the exposed inner surface of the base-band to heat the core and the rubber compound.

10. The method of making vehicle tires which comprises tightly securing against the outer peripheral surface of a metal base-band a mold having an internal annular recess exposed to a narrow peripheral zone of the base-band, introducing molten material into said recess and permitting it to solidify to form a core on the base-band, removing the mold from the base-band and core, applying rubber compound about the core and base-band, vulcanizing said rubber compound to the peripheral surface of the base-band, melting the core, and removing the material which composed it through a hole in the vulcanized assemblage.

Signed at New York in the county of New York and State of New York, this 27th day of February A. D. 1923.

CHARLES M. MANLY.